United States Patent
Ramachandra Iyer et al.

(10) Patent No.: US 11,546,403 B2
(45) Date of Patent: Jan. 3, 2023

(54) METHOD AND SYSTEM FOR PROVIDING PERSONALIZED CONTENT TO A USER

(71) Applicant: Wipro Limited, Bangalore (IN)

(72) Inventors: Manjunath Ramachandra Iyer, Bangalore (IN); Sethuraman Ulaganathan, Tiruchirapalli (IN)

(73) Assignee: Wipro Limited, Bangalore (IN)

( * ) Notice: Subject to any disclaimer, the term of this patent is extended or adjusted under 35 U.S.C. 154(b) by 456 days.

(21) Appl. No.: 16/282,335

(22) Filed: Feb. 22, 2019

(65) Prior Publication Data

US 2020/0213379 A1    Jul. 2, 2020

(30) Foreign Application Priority Data

Dec. 26, 2018 (IN) .............................. 201841049168

(51) Int. Cl.
| | |
|---|---|
| *G06F 15/16* | (2006.01) |
| *H04L 65/75* | (2022.01) |
| *G06F 16/28* | (2019.01) |
| *H04L 67/306* | (2022.01) |

(52) U.S. Cl.
CPC .......... *H04L 65/762* (2022.05); *G06F 16/285* (2019.01); *H04L 67/306* (2013.01)

(58) Field of Classification Search
CPC .... H04L 65/605; H04L 67/306; G06F 16/285
See application file for complete search history.

(56) References Cited

U.S. PATENT DOCUMENTS

| | | | |
|---|---|---|---|
| 7,996,417 B2 * | 8/2011 | Travieso | G06F 40/205 707/761 |
| 8,150,938 B1 * | 4/2012 | Walsh | H04L 67/2842 709/217 |
| 10,031,651 B2 | 7/2018 | Gibbon et al. | |
| 10,045,076 B2 * | 8/2018 | Carnevale | G06K 9/0061 |
| 2008/0091796 A1 * | 4/2008 | Story | H04L 65/403 709/217 |

(Continued)

OTHER PUBLICATIONS

Sherbin, M., "The Static Website Is Dead—Long Live Personalized Content", Content Marketing Institute, Oct. 5, 2012, 6 pages.

(Continued)

*Primary Examiner* — Yves Dalencourt
(74) *Attorney, Agent, or Firm* — Finnegan, Henderson, Farabow, Garrett & Dunner, LLP

(57) ABSTRACT

Disclosed herein is a method and system for providing personalized content to a user. The method comprises categorizing original content to be provided to user into a plurality of data packets. The data packets include data of similar domain. The user is categorized into one of plurality of classes and a vocabulary of words suitable for the class is identified. The class is associated with a domain. The system identifies relevant content for the class. Thereafter, the system modifies the original content by either by inserting a new data packet or deleting a data packet. A target content is generated for the class based on vocabulary of words associated with class and modified original content. Thereafter, the target content is provided to the class by incorporating one or more features of a presenter for presenting the target content. The present disclosure enhances user experience by personalizing content for the user.

16 Claims, 4 Drawing Sheets

(56) References Cited

U.S. PATENT DOCUMENTS

| | | | |
|---|---|---|---|
| 2008/0270567 A1* | 10/2008 | Stiers | H04L 67/108 |
| | | | 709/217 |
| 2010/0035226 A1* | 2/2010 | Lu | G09B 7/02 |
| | | | 434/350 |
| 2013/0080578 A1* | 3/2013 | Murad | H04N 21/25891 |
| | | | 709/217 |
| 2014/0280554 A1* | 9/2014 | Webb | H04L 67/22 |
| | | | 709/204 |
| 2016/0134692 A1* | 5/2016 | Ju | H04W 4/08 |
| | | | 709/204 |
| 2017/0235724 A1* | 8/2017 | Grewal | G06F 40/56 |
| | | | 704/9 |
| 2018/0095949 A1* | 4/2018 | Lewis | G06F 16/248 |
| 2018/0121787 A1* | 5/2018 | Hashimoto | G06F 40/253 |

OTHER PUBLICATIONS https://www.contentful.com/developers/docs/tutorials/general/setting-locales/, website, 17 pages.

* cited by examiner

METHOD AND SYSTEM FOR PROVIDING PERSONALIZED CONTENT TO A USER

TECHNICAL FIELD

The present subject matter is generally related to data processing and more particularly, but not exclusively, to method and system for providing personalized content to a user.

BACKGROUND

Presentations are often given to audiences with a variety of skills and interests. For example, audience may include engineers and salespeople. Engineers may be interested in more technical details during a presentation, while salespeople may be interested in information related to marketing and sales.

Consequently, presenters often ask the audience about their background and preferences in order to tailor the content of the presentation to the audience. For example, if a presenter is giving a presentation to the audience consisting mostly of engineers, then the presenter may include technical information that is useful for the engineers. However, some of the members may prefer different information than the technical information or additional information. For example, a salesperson may be interested in marketing and sales information, while an executive may be interested in higher level information and less detailed information. Hence it is challenging to present the same information/content with appropriate modifications to multiple classes of people and make them have the same understanding.

In the existing solutions, the same content is recommended for all the users irrespective of domain or class of the users and hence all the users may not have the same understanding of the content as they belong to different domain or class. Also, in the existing system, the content is pre-generated and static. There is no modification of the content based on the domain of the users in real-time.

The information disclosed in this background of the disclosure section is only for enhancement of understanding of the general background of the invention and should not be taken as an acknowledgement or any form of suggestion that this information forms the prior art already known to a person skilled in the art.

SUMMARY

Disclosed herein is a method of providing personalized content to a user. The method comprises categorizing, by a content personalization system, original content to be provided to the user into a plurality of data packets, wherein each of the plurality of data packets comprises data of similar domain. The method further comprises categorizing the user into one of plurality of classes based on one or more parameters and identifying a vocabulary of words suitable for the class, wherein each class is associated with a domain. Thereafter, the method comprises identifying a relevant content for the class based on domain of the user in the class, profile of creator creating the original content and the original content. Once the relevant content is identified, the original content is modified for the class by performing at least one of inserting a new data packet, obtained based on the relevant content, in the original content and deleting a data packet from the plurality of data packets in the original content. The modification is based on comparison between the original content and the relevant content, the method further comprises generating a target content for the class based on the vocabulary of words associated with the class and modified original content. Thereafter, the target content is provided to the class by incorporating one or more features of a presenter, selected from one or more presenters, for presenting the target content.

Further, the present disclosure discloses a content personalization system for providing personalized content to a user. The content personalization system comprises a processor and a memory communicatively coupled to the processor, wherein the memory stores the processor-executable instructions, which, on execution, causes the processor to categorize content to be provided to the user into a plurality of data packets. Each of the plurality of data packets comprises data of similar domain. Thereafter, the processor categorizes the user into one of plurality of classes based on one or more parameters and identifies a vocabulary of words suitable for the class. And each class is associated with a domain. Once the user is categorized, the processor identifies a relevant content for the class based on domain of the user in the class, profile of creator creating the original content and the original content. Once the relevant content is identified, the processor modifies the original content for the class by performing at least one of inserting a new data packet, obtained based on the relevant content, in the original content and deleting a data packet from the plurality of data packets in the original content. The modification is based on comparison between the original content and the relevant content. Further, the processor generates a target content for the class based on the vocabulary of words associated with the class and modified original content. Thereafter, processor provides the target content to the class by incorporating one or more features of a presenter, selected from one or more presenters, for presenting the target content.

Furthermore, the present disclosure comprises a non-transitory computer readable medium including instructions stored thereon that when processed by a content personalization system, causes the content personalization system to perform operations comprising categorizing original content to be provided to the user into a plurality of data packets. Each of the plurality of data packets comprises data of similar domain. Further, the instructions cause the processor to categorize the user into one of plurality of classes based on one or more parameters and identifying a vocabulary of words suitable for the class. Each class is associated with a domain. Upon categorizing the user into one of plurality of classes, the instructions cause the processor to identify relevant content for the class based on domain of the user in the class, profile of creator creating the original content and the original content. Subsequently, the instructions cause the processor to modify the original content for the class by performing at least one of inserting a new data packet, obtained based on the relevant content, in the original content and deleting a data packet from the plurality of data packets in the original content. The modification is based on comparison between the original content and the relevant content. Further, the instructions cause the processor to generate a target content for the class based on the vocabulary of words associated with the class and modified original content. Finally, the instructions cause the processor to provide the target content to the class by incorporating one or more features of a presenter, selected from one or more presenters, for presenting the target content.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The accompanying drawings, which are incorporated in and constitute a part of this disclosure, illustrate exemplary embodiments and, together with the description, explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and regarding the accompanying figures, in which:

Figure 1:
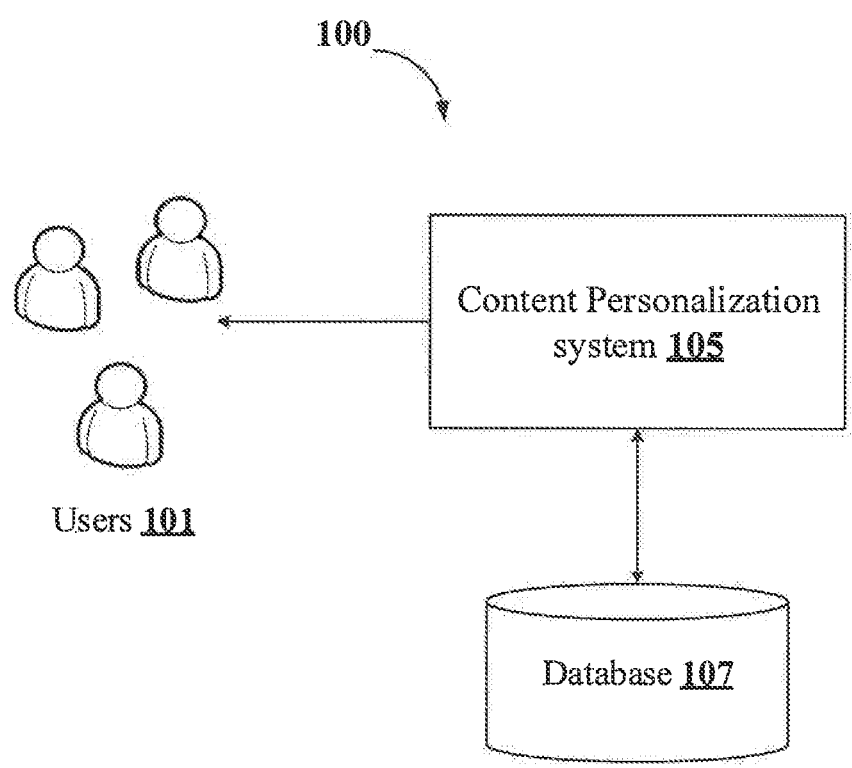
FIG. 1 shows an exemplary environment for providing a personalized content to a user in accordance with some embodiments of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the specific forms disclosed, but on the contrary, the disclosure is to cover all modifications, equivalents, and alternative falling within the scope of the disclosure.

The terms "comprises", "comprising", "includes", "including" or any other variations thereof, are intended to cover a non-exclusive inclusion, such that a setup, device, or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

The present disclosure relates to method and system for providing a personalized content to a user. The system categorizes original content to be provided to the user into a plurality of data packets. Each of the plurality of data packets comprises data of similar domain. As an example, the domain may be "Artificial Intelligence", "Computer Networks" and "Internet of Things (IoT). The data packets may comprise at least one of text, figure, table, audio clip or video clip. Thereafter, the system categorizes the user into one of plurality of classes based on one or more parameters. Each class is associated with a domain. For example, class 1 may include users who belong to the domain "AI". Similarly, class 2 may include users who belong to the domain "IoT" and so on. The one or more parameters comprises historical data of the user, previous content effectively provided to the user and profile of the user. The system also identifies vocabulary of words suitable for the class. Thereafter, the system identifies relevant content for the class based on domain of the user in the class, profile of creator creating the original content and the original content. Once the relevant content is identified, the original content is modified for the class by performing at least one of inserting a new data packet in the original content and deleting a data packet from the plurality of data packets in the original content. In an embodiment, the new data packet may be obtained based on the identified relevant content.

The system generates a target content for the class based on the vocabulary of words associated with the class and the modified original content. The target content is provided to the class by incorporating one or more features of a presenter for presenting the target content. The one or more features of the presenter is pre-stored in a database associated with the system. In this manner, the content to be provided to the user is personalized based on context and domain or class of the user and also it is presented by incorporating one or more features of a presenter selected for presenting the content.

In the following detailed description of the embodiments of the disclosure, reference is made to the accompanying drawings that form a part hereof, and in which are shown by way of illustration of embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

FIG. 1 shows an exemplary environment 100 for providing a personalized content to a user in accordance with some embodiments of the present disclosure.

The environment 100 may comprise a plurality of users 101, a content personalization system 105 and a database 107 associated with the content personalization system 105. In an embodiment, the content personalization system 105 may be provided as an application to the plurality of users. The application may be used to personalize the content to be provided to the plurality of users. When the content personalization system 105 is invoked, the content personalization system 105 [also referred as system] categorizes the content which is the original content to be provided to the plurality of users into a plurality of data packets. The original content may be provided to the content personalization system 105 in the form of a document. The content personalization system 105 may include original content related to various domains. Data associated with creator of the original content is stored in the database 107. As an example, data may include, name of the creator, domain of the creator and the like. Each data packet comprises data of similar domain. As an example, the data packet 1 may comprise data related to the domain "Artificial Intelligence". The data packet 2 may comprise data related to the domain "Robotics". Data packet 3 may comprise data related the domain "Communication Network". The plurality of data packets may comprise at least one of text, figure, table, audio clip or video clip. Each data packet may be associated with a title and metadata. The metadata comprises type of each of the plurality of data packets, identification number of each of the plurality of data packets, position of each of the plurality of data packets and start and end time of each of the plurality of data packets. As an example, the type of the data packet may be "word", "table", "presentation slides" and "figures". The identification number may be the unique identification number assigned to each data packet. Each data packet may retain same structure of the original document as in terms of headings and sub headings present in the original document.

In an embodiment, the system 105 categorizes the user to whom the original content has to be provided into one of plurality of classes. Each class is associated with a domain. As an example, class 1 may be associated with "AI" domain. Class 2 may be associated with "IoT" domain. Class 3 may be associated with "Mechanical Engineering" domain and so on. The user is categorized into one of the plurality of classes based on one or more parameters. The one or more parameters may include historical data of the user, previous content effectively provided to the user and profile of the user. The profile of the user may include data about domain to which the user belongs. The system 105 also identifies vocabulary of words suitable for the users in the class. As an example, the words suitable for the users in the class 1 may be "machine learning", "natural language processing", "robotics" and the like. Similarly, the words suitable for the users in class 2 may be "connected devices", "sensors" and so on.

In an embodiment, the system 105 identifies relevant content for the class based on domain of the user in the class, profile of creator creating the original content and the original content. Once the relevant content is identified, the system 105 compares the original content and the relevant content and may identify one or more new data packets to be inserted to the original content. The system 105 may also identify that one or more data packets has to be deleted from the original content based on relevancy of the content. In an embodiment, the one or more new data packets may be identified based on the relevant content. The system 105 modifies the original content by performing either inserting the new data packets or deleting the data packets from the original content. Thereafter, the system 105 may generate a target content based on the modified content and the vocabulary of the words identified for the class. The target content is provided to the class by incorporating one or more features of a presenter for presenting the target content. The system 105 extracts one or more features of each of the one or more presenters and stores the one or more features in the database 107. The one or more features may include, but is not limited to, illustrations used while presenting content, examples used, jokes, voice modulation, elevated pitches while presenting, usage of filler words, speed at which the content is presented and body language. As an example, the users in class 1 may select presenter 1 among one or more presenters, presenter 1 to presenter n, associated with the content personalization system 105. The features of the presenter 1 is incorporated to the target content while providing the target content to the class thereby personalizing the content to the users in the class based on domain and context of the users in the class.

Figure 2:
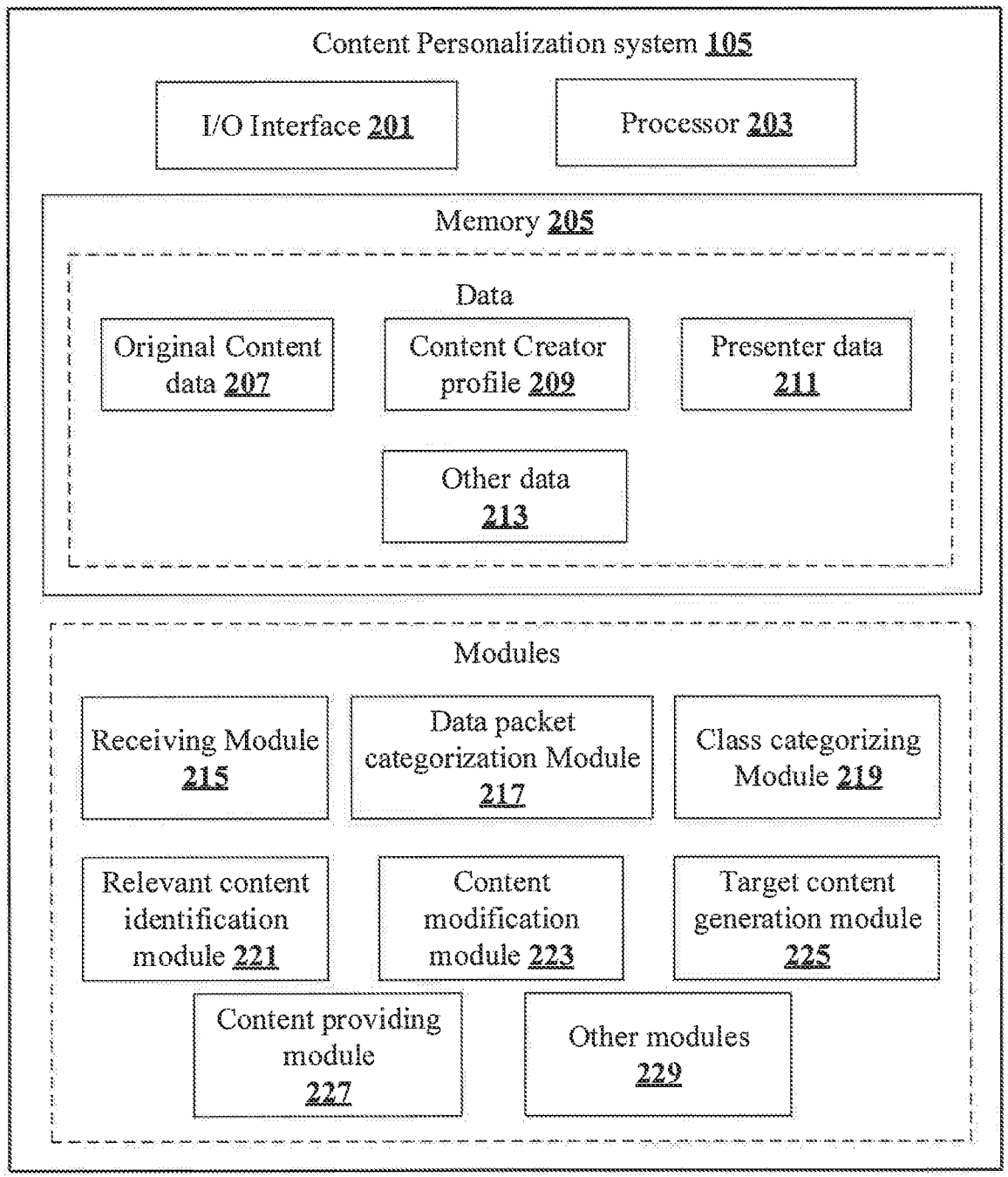
FIG. 2 shows block diagram of a content personalization system in accordance with some embodiments of the present disclosure.

FIG. 2 shows a block diagram of a content personalization system 105 in accordance with some embodiments of the present disclosure.

The content personalization system 105 may include an I/O interface 201, a processor 203, and a memory 205. The I/O interface 201 may be configured to receive original content documents and to provide personalized target content documents to the users. The memory 205 may be communicatively coupled to the processor 203. The processor 203 may be configured to perform one or more functions of the content personalization system 105.

In some implementations, the content personalization system 105 may include data and modules for performing various operations in accordance with embodiments of the present disclosure. In an embodiment, the data may be stored within the memory 205 and may include, without limiting to, original content data 207, content creator profile 209, presenter data 211 and other data.

In some embodiments, the data may be stored within the memory 205 in the form of various data structures. Additionally, the data may be organized using data models, such as relational or hierarchical data models. The other data 213 may store data, including temporary data and temporary files, generated by the modules for performing various functions of the content personalization system 105.

In an embodiment, one or more modules may process the data of the content personalization system 105. In one implementation, the one or more modules may be communicatively coupled to the processor 203 for performing one or more functions of the content personalization system 105. The modules may include, without limiting to, a receiving module 215, a data packet categorization module 217, a class categorizing module 219, a relevant content identification module 221, a content modification module 223, a target content generation module 225 and a content providing module 227.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. In an embodiment, the other modules 229 may be used to perform various miscellaneous functionalities of the content personalization module. It will be appreciated that such modules may be represented as a single module or a combination of different modules. Furthermore, a person of ordinary skill in the art will appreciate that in an implementation, the one or more modules may be stored in the memory 205, without limiting the scope of the disclosure. The said modules when configured with the functionality defined in the present disclosure will result in a novel hardware.

In an embodiment, the receiving module 215 may be configured to receive original content. The original content may be provided in the form of a document. The original content may be related to one or more domains such as robotics, AI, computer networks, mechanical engineering, life sciences and the like. The original content may be stored as original content data 207.

In an embodiment, the data packet categorization module 217 may be configured to categorize the original content into plurality of data packets. Each of the plurality of data packets comprises data of similar domain. As an example, the data packet 1 may comprise data related to the domain "Artificial Intelligence". The data packet 2 may comprise data related to the domain "Robotics". Data packet 3 may comprise data related the domain "communication network". The plurality of data packets may comprise at least one of text, figure, table, audio clip or video clip. Each data packet may be associated with a title and metadata. The metadata comprises type of each of the plurality of data packets, identification number of each of the plurality of data packets, position of each of the plurality of data packets and start and end time of each of the plurality of data packets. As an example, the type of the data packet may be "word", "table", "presentation slides" and "figures". The identification number may be the unique identification number assigned to each data packet. Each data packet may retain same structure of the original document as in terms of headings and sub headings present in the original document.

In an embodiment, the class categorizing module 219 may be configured to categorize the users, for whom the original content has to be provided, into one of plurality of classes. Each class is associated with a domain i.e. the users of each class belong to similar domain. As an example, class 1 may be associated with "AI" domain. Class 2 may be associated with "IoT" domain. Class 3 may be associated with "mechanical engineering" domain and so on. The user is categorized into one of the plurality of classes based on one or more parameters. The one or more parameters may include historical data of the user, previous content effectively provided to the user and profile of the user. The profile of the user may include data about domain to which the user belongs. The historical data may include information on number of previous sessions attended by the user, type of sessions attended by the user and the user feedback on the sessions. The system 105 may also identify vocabulary of words suitable for the users in the class. As an example, the words suitable for the users in the class 1 may be "machine learning", "natural language processing", "robotics" and the like. Similarly, the vocabulary of words suitable for the users in class 2 may be "connected devices", "sensors" and so on. The vocabulary of words may also be identified based on previous content effectively provided to the user. In an embodiment, the class categorizing module 219 may identify the class to which the users belong and identify vocabulary of words suitable for the class using a forward classifier. The vocabulary of words includes equivalent words and words identified as effective for the class. In an embodiment, the forward classifier may be realized through a Long Short Term Memory (LSTM). The historical data may include summarized content delivered in the past which is associated with the corresponding 'class' that received it, jokes or illustrations along with labels (for example joke on being late to a meeting), images, tables and visual expressions such as the face, body movement, associated audio and the like. All these distinct data is normalized and associated to form a sequence. In one implementation, this sequence is further concatenated with other input parameters to form a larger stream. The different parts of the document may be relevant for appropriate class of users and marked to be used and labelled data for training purpose. Essentially large sequence or part of the document maps to a class (and a set of vocabulary of words concatenated to the class in the labelled output data). During concatenation, the distinct data are separated by a known string (for example "0.4 0.3 0.4 0.8 0.6 0.8"). The labels on appropriateness for the distinct class of users are generated by making use of implicit feedback from camera or explicit feedback from the users.

In an embodiment, the relevant content identification module 221 may be configured to identify relevant content for each of the plurality of class. The relevant content is identified based on domain of the user in the class, profile of creator creating the original content and the original content. The profile of the creator may comprise data such as name of the creator, domain to which the creator belongs and other documents provided by the creator. The content creator profile 209 is stored in the memory of the system 105. As an example, the original content may comprise data related to AI and robotics. The relevant content identification module 221 may identify that the domain of the class is "IoT". Therefore, the relevant content identification module 221 identifies relevant content related to the domain "IoT" from one or more external resources. The one or more external resources may be Internet or some other document related to IoT.

In an embodiment, the content modification module 223 may be configured to modify the original content for the class by comparing the original content and the relevant content. The original content may be modified by performing by at least one of inserting a new data packet in the original content and deleting a data packet from the plurality of data packets in the original content. The new data packet may be identified based on the relevant content. As an example, since the relevant content is related to the domain "IoT", a new data packet related to the relevant content may be inserted to the original content. As an example, if some of the data packets are not relevant for the class, those data packets may be deleted. The relevancy of the data packets may be detected based on usage of the data packets by the presenter while presenting the content.

In an embodiment, the target content generation module 225 may be configured to generate the target content based on the modified original content and vocabulary of words identified for the class using inverse classifier. In an embodiment, the inverse classifier may be realized through the LSTM.

The inverse classifier has similar architecture to the forward classifier with appropriate input parameters concatenated from the input data stream and the output stream to form a labelled training set. The input and output parameters are selected such that the output of the forward classifier (class, vocabulary) is the input for the inverse classifier and further, the output from inverse classifier (document generated for the particular class of users) is connected back to the forward classifier to form a crisscross architecture. This architecture iteratively makes the document better aligned with the class of users.

As an example, if the class is related to "IoT" the vocabulary of words identified for the class may be "sensors", "connected devices" and so on. These words may be incorporated in the target content. When the target content is generated, the processor 203 identifies position in the original content where the new data packet has to be inserted. The position is identified based on available time slot in the target content and context of the new data packet. As an example, if the target content is provided in the form of a Power Point (PPT), the data associated with the target content is stored in the database 107 as shown in the below Table 1.

TABLE 1

| Slide Number | Object Type | ID | Position | User Reference (In terms of time) |
|---|---|---|---|---|
| 5 | Graph | G1 | (20, 30) | 10 Sec to 40 Sec |
| 10 | Figure | F1 | (30, 40) | 10 sec to 40 Sec |
| 30 | Speech | S1 | Nil | 200 to 230 sec |

As shown in the Table 1, the database 107 stores data such as slide number, object type, identification number, position of the content and the user reference. As an example, at slide number 5, the target content may include a graph with identification number "G1". The position of the graph in the slide number 5 may be at (20,30). The position may be with respect to top left corner of the slide. Further, the graph may be displayed in the slide from 10 to 40 seconds time frame. The new data packet may be inserted based on availability of the time slot in the target content. As an example, since in the time slot 10-40 seconds, a graph is displayed, the new data packet may overlap if displayed during the time period 10-40 seconds. Hence, the new data packet may be displayed during the time period "200-230" seconds when the presenter is not referring to any content such as figures or graphs and the content is provided only through speech.

In an embodiment, the content providing module 227 may be configured to provide the target content to the user. The target content may be provided in one or more formats such as PPT, word document, pdf document, tables, excel document, images, video and audio. The target content is provided by incorporating one or more features of a presenter who is selected for presenting the content. The one or more features may include illustrations used while presenting content, examples used, jokes, voice modulation, elevated pitches while presenting, usage of filler words, speed at which the content is presented and body language. The one or more features of the one or more presenters are extracted using Natural Language Processing (NLP) technique. The one or more features are stored as presenter data 211. In an embodiment, an avatar of the presenter may be used for presenting the content using NLP.

Exemplary Embodiment

Consider an example wherein a presenter "A" wishes to present on a technology "AI based automation" for different groups across an organization. The presentation (original content) may be in the form of a PPT. "A" has a few slides of information towards the technology on "AI based automation". However, just a day before, "A" may fall sick and hence unable to make the presentation. "A" invokes the application which implements the present disclosure to make the presentation.

When the application is invoked, the application categorizes the users into plurality of classes wherein each of the plurality of classes is associated with a domain. As an example, the application categorizes the group of users into classes namely class 1 which is associated with the domain "AI" and class 2 which is associated with the domain "cloud computing". The application categorizes the users into plurality of classes based on one or more parameters such as historical data of the user, previous content effectively provided to the user and profile of the user. The profile of the user may include information such as name of the user, the domain to which the user belongs, department of the user and so on. The application also identifies vocabulary of words suitable for the class. As an example, the words suitable for class 1 may be "machine learning", "natural language processing", "robotics" and the like. Similarly, the words suitable for the users in class 2 may be "servers", "database", "network". Once the users are categorized, the application identifies relevant content for the users based on the domain of the user in the class, profile of creator creating the original content and the original content. As an example, the application identifies the relevant content in the field of "cloud computing" as there are few people in the group working on "cloud computing". The relevant content may include an example related to the "cloud computing". Once the relevant content is identified, the application modifies the original content by inserting the example in the PPT. In order to insert the example, the application identifies the available position in the PPT. As an example, the PPT may include 5 slides. The data related to each slide is stored in the database 107 as a table 2 shown below.

TABLE 2

| Slide Number | Object Type | ID | Position | User Reference (In terms of time) |
|---|---|---|---|---|
| 1 | Graph | G1 | (20, 30) | 10 Sec to 40 Sec |
| 2 | Figure | F1 | (30, 40) | 10 sec to 40 Sec |
| 3 | Figure | F2 | (20, 30) | 30 sec to 40 Sec |
| 4 | Speech | S1 | — | 10 sec to 300 Sec |
| 5 | Speech | S2 | — | 10 Sec to 300 Sec |

As shown in the above table 2, in Slide number 1, a graph with Identification number (ID) G1, is displayed wherein the graph is related to the "AI based automation". The graph is displayed at a position (20,30) in the slide and the graph is displayed between 10 to 40 seconds. Similarly, in slide number 3, a figure with ID FI is displayed wherein the figure is related to the "AI based automation". The application detects that in slide number 4 and 5, the presenter is presenting the information through speech only. Therefore, the application detects that the "example" may be inserted in either slide number 4 or slide number 5. Further, in another embodiment, while the presenter is presenting the information, the presenter may not refer to the data in slide number 1. In this scenario, the data in slide number 1 may be deleted.

Further, the application generates a target content based on the modified original content and based on vocabulary of words identified for the class. The example to be inserted may have some words such as "servers", "database" and "network" to make the example more relevant for the class 2. Once the target content is generated, the application provides the target content to the class 2 by incorporating one or more features of the presenter A. As an example, the one or more features of the presenter "A" which are pre-recorded are that the presenter A uses filler words such as "like" while making the presentation. Therefore, the application invokes an avatar of the presenter "A" to make the presentation by incorporating the features of the presenter "A".

Figure 3:
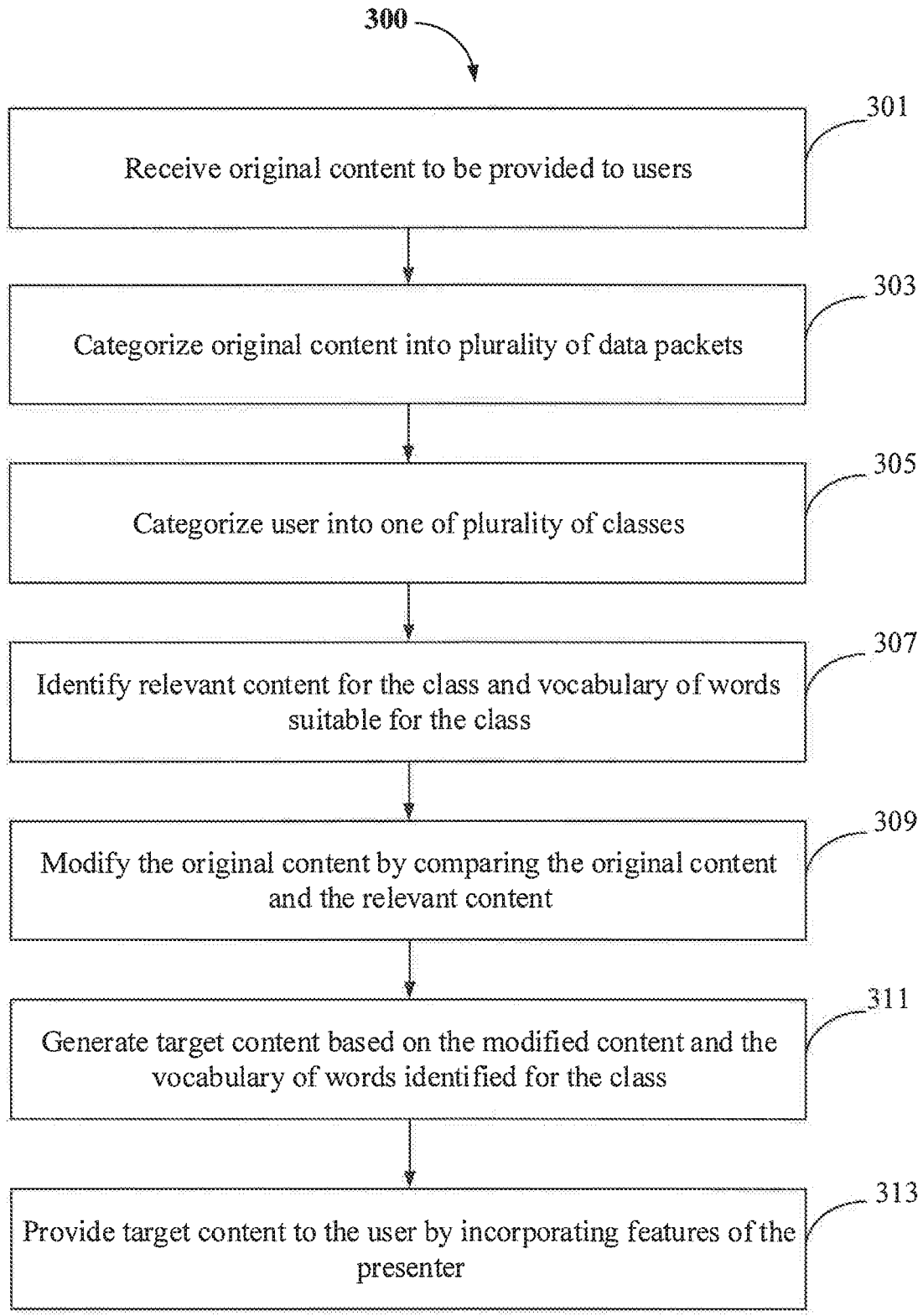
FIG. 3 shows a flowchart illustrating method of providing a personalized content to a user in accordance with some embodiments of the present disclosure.

FIG. 3 shows a flowchart illustrating a method of providing personalized content to the user in accordance with some embodiments of the present disclosure.

As illustrated in FIG. 3, the method 300 includes one or more blocks illustrating a method of personalizing content to the user. The method 300 may be described in the general context of computer executable instructions. Generally, computer executable instructions can include routines, programs, objects, components, data structures, procedures, modules, and functions, which perform specific functions or implement specific abstract data types.

The order in which the method 300 is described is not intended to be construed as a limitation, and any number of the described method blocks can be combined in any order to implement the method. Additionally, individual blocks may be deleted from the methods without departing from the spirit and scope of the subject matter described herein. Furthermore, the method can be implemented in any suitable hardware, software, firmware, or combination thereof.

At block 301, the method includes receiving original content. The original content may be provided in the form of a document. The original content may be related to various domains.

At block 303, the method includes categorizing the original content into plurality of data packets. Each of the plurality of data packets comprises data of similar domain. As an example, the data packet 1 may comprise data related to the domain "Artificial Intelligence". The data packet 2 may comprise data related to the domain "Robotics". Data packet 3 may comprise data related the domain "communication network". The plurality of data packets may comprise at least one of text, figure, table, audio clip or video clip.

Each data packet may be associated with a title and metadata. The metadata comprises type of each of the plurality of data packets, identification number of each of the plurality of data packets, position of each of the plurality of data packets and start and end time of each of the plurality of data packets.

At block 305, the method includes categorizing the users into one of plurality of classes. Each class is associated with a domain i.e. the users of each class belong to similar domain. As an example, class 1 may be associated with "AI" domain. Class 2 may be associated with "IoT" domain. Class 3 may be associated with "mechanical engineering" domain and so on. The user is categorized into one of the plurality of classes based on one or more parameters. The one or more parameters may include historical data of the user, previous content effectively provided to the user and profile of the user. The profile of the user may include data about domain to which the user belongs. The system 105 also identifies vocabulary of words suitable for the users in the class. As an example, the words suitable for the users in the class 1 may be "machine learning", "natural language processing", "robotics" and the like. Similarly, the vocabulary of words suitable for the users in class 2 may be "connected devices", "sensors" and so on.

At block 307, the method includes identifying a relevant content for the class based on domain of the user in the class, profile of creator creating the original content and the original content. As an example, the original content may comprise data related to AI and robotics. The relevant content identification module 221 may identify that the domain of the class is "IoT". Therefore, the relevant content identification module 221 identifies relevant content related to the domain "IoT" from one or more external resources.

At block 309, the method includes, modifying the original content for the class by performing at least one of inserting a new data packet in the original content and deleting a data packet from the plurality of data packets in the original content. The modification may be based on comparison between the original content and the relevant content. The new data packet may be obtained based on the relevant content.

At block 311, the method includes, generating a target content for the class based on the vocabulary of words associated with the class and modified original content.

At block 313, the method includes providing the target content to the class by incorporating one or more features of a presenter for presenting the target content. The one or more features of the presenter comprises illustrations used while presenting content, examples used, jokes, voice modulation, elevated pitches while presenting, usage of filler words, speed at which the content is presented and body language. The one or more features of the presenter is extracted using one or more sensors associated with the content personalization system 105. As an example, the sensors may include camera, microphone and the like.

Computer System

Figure 4:
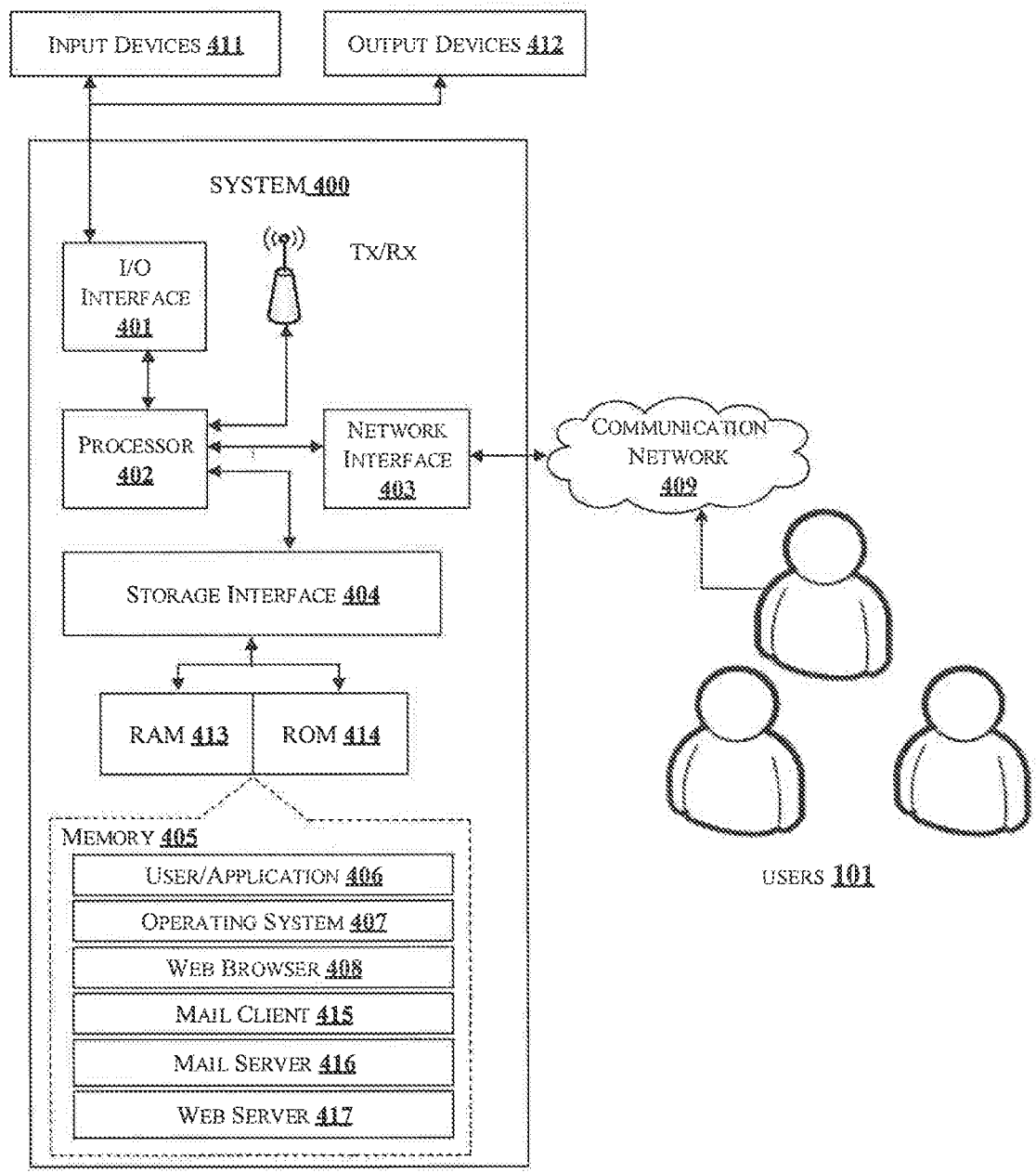
FIG. 4 illustrates a block diagram of an exemplary computer system for implementing embodiments consistent with the present disclosure.

FIG. 4 illustrates a block diagram of an exemplary computer system 400 for implementing embodiments consistent with the present disclosure. In an embodiment, the computer system 400 may be content personalization system 105, which is used for automating context-based switching between user activities. The computer system 400 may include a central processing unit ("CPU" or "processor") 402. The processor 402 may comprise at least one data processor for executing program components for executing user or system-generated business processes. A user 101 may include a person, a user 101 in the computing environment 100, users 101 using the content personalization system 105, or such a device itself. The processor 402 may include specialized processing units such as integrated system (bus) controllers, memory management control units, floating point units, graphics processing units, digital signal processing units, etc.

The processor 402 may be disposed in communication with one or more input/output (I/O) devices (411 and 412) via I/O interface 401. The I/O interface 401 may employ communication protocols/methods such as, without limitation, audio, analog, digital, stereo, IEEE-1394, serial bus, Universal Serial Bus (USB), infrared, PS/2, BNC, coaxial, component, composite, Digital Visual Interface (DVI), high-definition multimedia interface (HDMI), Radio Frequency (RF) antennas, S-Video, Video Graphics Array (VGA), IEEE 802.n/b/g/n/x, Bluetooth, cellular (e.g., Code-Division Multiple Access (CDMA), High-Speed Packet Access (HSPA+), Global System For Mobile Communications (GSM), Long-Term Evolution (LTE) or the like), etc. Using the I/O interface 401, the computer system 400 may communicate with one or more I/O devices 411 and 412. In some implementations, the I/O interface 401 may be used to connect to a user device, such as a smartphone, a laptop, or a desktop computer associated with the user 101, through which the user 101 interacts with the content personalization system 105.

In some embodiments, the processor 402 may be disposed in communication with a communication network 409 via a network interface 403. The network interface 403 may communicate with the communication network 409. The network interface 403 may employ connection protocols including, without limitation, direct connect, Ethernet (e.g., twisted pair 10/100/1000 Base T), Transmission Control Protocol/Internet Protocol (TCP/IP), token ring, IEEE 802.11a/b/g/n/x, etc. Using the network interface 403 and the communication network 409, the computer system 400 may communicate with the user 101 to provide personalize content to the user 101.

The communication network 409 can be implemented as one of the several types of networks, such as intranet or Local Area Network (LAN) and such within the organization. The communication network 409 may either be a dedicated network or a shared network, which represents an association of several types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the communication network 409 may include a variety of network devices, including routers, bridges, servers, computing devices, storage devices, etc.

In some embodiments, the processor 402 may be disposed in communication with a memory 405 (e.g., RAM 413, ROM 414, etc. as shown in FIG. 4) via a storage interface 404. The storage interface 404 may connect to memory 405 including, without limitation, memory drives, removable disc drives, etc., employing connection protocols such as Serial Advanced Technology Attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 405 may store a collection of program or database components, including, without limitation, user/application 406, an operating system 407, a web browser 408, mail client 415, mail server 416, web server 417 and the like. In some embodiments, computer system 400 may store user/application data 406, such as the data, variables, records, etc. as described in this invention. Such databases may be implemented as fault-tolerant, relational, scalable, secure databases such as Oracle® or Sybase®.

The operating system 407 may facilitate resource management and operation of the computer system 400. Examples of operating systems include, without limitation, APPLE MACINTOSH® OS X, UNIX®, UNIX-like system distributions (E.G., BERKELEY SOFTWARE DISTRIBUTION™ (BSD), FREEBSD™, NETBSD™, OPENBSD™, etc.), LINUX DISTRIBUTIONS™ (E.G., RED HAT™, UBUNTU™, KUBUNTU™, etc.), IBM™ OS/2, MICROSOFT™ WINDOWS™ (XP™, VISTA™/7/8, 10 etc.), APPLE® IOS™, GOOGLE® ANDROID™, BLACKBERRY® OS, or the like. A user 103 interface may facilitate display, execution, interaction, manipulation, or operation of program components through textual or graphical facilities. For example, user 101 interfaces may provide computer interaction interface elements on a display system operatively connected to the computer system 400, such as cursors, icons, check boxes, menus, windows, widgets, etc. Graphical User 103 Interfaces (GUIs) may be employed, including, without limitation, APPLE MACINTOSH® operating systems, IBM™ OS/2, MICROSOFT™ WINDOWS™ (XP™, VISTA™/7/8, 10 etc.), Unix® X-Windows, web interface libraries (e.g., AJAX™, DHTML™, ADOBES FLASH™, JAVASCRIPT™, JAVA™, etc.), or the like.

Furthermore, one or more computer-readable storage media may be utilized in implementing embodiments consistent with the present invention. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., non-transitory. Examples include Random Access Memory (RAM), Read-Only Memory (ROM), volatile memory, nonvolatile memory, hard drives, Compact Disc (CD) ROMs, Digital Video Disc (DVDs), flash drives, disks, and any other known physical storage media.

Advantages of the embodiment of the present disclosure are illustrated herein.

In an embodiment, the present disclosure provides a personalized content for the user.

In an embodiment, the present disclosure personalizes the content to be provided to the user based on domain of the user and context of the user.

In an embodiment, the present disclosure generates the content for the user in real-time based on domain of the user.

In an embodiment, the present disclosure adapts presenter's style while providing the content to the user thereby enriching the experience of the user during presentation.

In an embodiment, the application implementing the present disclosure is scalable in terms of adding new content which is relevant for the user and deleting contents which are irrelevant to the user during presentation.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise. The enumerated listing of items does not imply that any or all the items are mutually exclusive, unless expressly specified otherwise.

The terms "a", "an" and "the" mean "one or more", unless expressly specified otherwise.

A description of an embodiment with several components in communication with each other does not imply that all such components are required. On the contrary, a variety of optional components are described to illustrate the wide variety of possible embodiments of the invention.

When a single device or article is described herein, it will be clear that more than one device/article (whether they cooperate) may be used in place of a single device/article. Similarly, where more than one device or article is described herein (whether they cooperate), it will be clear that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

| Referral Numerals: | |
| --- | --- |
| Reference Number | Description |
| 100 | Environment |
| 101 | Users |
| 105 | Content personalization system |
| 107 | Database |
| 201 | I/O Interface |
| 203 | Processor |
| 205 | Memory |
| 207 | Original content data |
| 209 | Content creator profile |

-continued

Referral Numerals:

| Reference Number | Description |
| --- | --- |
| 211 | Presenter data |
| 213 | Other data |
| 215 | Receiving Module |
| 217 | Data packet categorization Module |
| 219 | Class categorizing module |
| 221 | Relevant content identification Module |
| 223 | Content modification Module |
| 225 | Target content generation Module |
| 227 | Content providing Module |
| 229 | Other modules |
| 400 | Exemplary computer system |
| 401 | I/O Interface of the exemplary computer system |
| 402 | Processor of the exemplary computer system |
| 403 | Network interface |
| 404 | Storage interface |
| 405 | Memory of the exemplary computer system |
| 406 | User/Application |
| 407 | Operating system |
| 408 | Web browser |
| 409 | Communication network |
| 411 | Input devices |
| 412 | Output devices |
| 413 | RAM |
| 414 | ROM |
| 415 | Mail Client |
| 416 | Mail Server |
| 417 | Web Server |

What is claimed is:

1. A method of providing personalized content to a user, the method comprising:

categorizing, by a content personalization system, original content to be provided to the user into a plurality of data packets, wherein the original content comprises content related to one or more domains, wherein each of the plurality of data packets comprises data of similar domains;

categorizing, by the content personalization system, the user into a class of a plurality of classes based on one or more parameters associated with the user and identifying a vocabulary of words suitable for the class, wherein each class is associated with a domain of the one or more domains;

identifying, by the content personalization system, a relevant content for the class based on domain of the user in the class, profile of creator creating the original content and the original content;

modifying, by the content personalization system, the original content for the class by performing at least one of inserting a new data packet, obtained based on the relevant content, in the original content and deleting a data packet from the plurality of data packets in the original content, wherein modification is based on comparison between the original content and the relevant content;

generating, by the content personalization system, a target content for the class based on the vocabulary of words associated with the class and modified original content, wherein the vocabulary of words is identified by identifying the class to which the user belongs and identifying the vocabulary of words suitable for the class using a forward classifier realized through a Long Short Term Memory (LSTM), and wherein the vocabulary of words comprises equivalent words and words identified as effective for the class; and providing, by the content personalization system, the target content to the class by incorporating one or more features of a presenter, selected from one or more presenters, for presenting the target content.

2. The method as claimed in claim 1, wherein the one or more parameters comprises historical data of the user, previous content effectively provided to the user and profile of the user.

3. The method as claimed in claim 1, wherein one or more features of the one or more presenters are extracted using one or more sensors comprising image sensors and audio sensors associated with the content personalization system.

4. The method as claimed in claim 1, wherein the one or more features comprises illustrations used while presenting content, examples used, jokes, voice modulation, elevated pitches while presenting, usage of filler words, speed at which the content is presented and body language.

5. The method as claimed in claim 1, wherein each of the plurality of data packets is associated with a title and metadata, wherein the metadata comprises type of each of the plurality of data packets, identification number of each of the plurality of data packets, position of each of the plurality of data packets and start and end time of each of the plurality of data packets.

6. The method as claimed in claim 1, wherein the plurality of data packets comprises at least one of text, figure, table, audio clip or video clip.

7. The method as claimed in claim 1, wherein performing at least one of inserting the new data packet and deleting the data packet in the original content comprises:

detecting position for adding the new data packet based on available time slot in the target content and context of the new data packet; and detecting relevancy of the data packet from the plurality of data packets for deleting the data packet, wherein the relevancy is detected based on non-usage of the data packet by the presenter while presenting the target content.

8. A content personalization system for providing personalized content to a user, the content personalization system comprising:

a processor; and a memory communicatively coupled to the processor, wherein the memory stores the processor-executable instructions, which, on execution, causes the processor to:

categorize original content to be provided to the user into a plurality of data packets, wherein the original content comprises content related to one or more domains, wherein each of the plurality of data packets comprises data of similar domains;

categorize the user into a class of a plurality of classes based on one or more parameters associated with the user and identifying a vocabulary of words suitable for the class, wherein each class is associated with a domain of the one or more domains;

identify relevant content for the class based on domain of the user in the class, profile of creator creating the original content and the original content;

modify the original content for the class by performing at least one of inserting a new data packet, obtained based on the relevant content, in the original content and deleting a data packet from the plurality of data packets in the original content, wherein modification is based on comparison between the original content and the relevant content;

generate a target content for the class based on the vocabulary of words associated with the class and modified original content, wherein the vocabulary of words is identified by identifying the class to which the user belongs and identifying the vocabulary of words suitable for the class using a forward classifier realized through a Long Short Term Memory (LSTM), and wherein the vocabulary of words comprises equivalent words and words identified as effective for the class; and provide the target content to the class by incorporating one or more features of a presenter, selected from one or more presenters, for presenting the target content.

9. The content personalization system as claimed in claim 8, wherein the one or more parameters comprises historical data of the user, previous content effectively provided to the user and profile of the user.

10. The content personalization system as claimed in claim 8, wherein the processor extracts one or more features of the one or more presenters using one or more sensors comprising image sensors and audio sensors associated with the content personalization system.

11. The content personalization system as claimed in claim 8, wherein the one or more features comprises illustrations used while presenting content, examples used, jokes, voice modulation, elevated pitches while presenting, usage of filler words, speed at which the content is presented and body language.

12. The content personalization system as claimed in claim 8, wherein each of the plurality of data packets is associated with a title and metadata, wherein the metadata comprises type of each of the plurality of data packets, identification number of each of the plurality of data packets, position of each of the plurality of data packets and start and end time of each of the plurality of data packets.

13. The content personalization system as claimed in claim 8, wherein the plurality of data packets comprises at least one of text, figure, table, audio clip or video clip.

14. The content personalization system as claimed in claim 8, wherein the processor performs at least one of inserting the new data packet and deleting the data packet in the original content by:

detecting position for adding the new data packet based on available time slot in the target content and context of the new data packet; and detecting relevancy of the data packet from the plurality of data packets for deleting the data packet, wherein the relevancy is detected based on non-usage of the data packet by the presenter while presenting the target content.

15. A non-transitory computer readable medium including instructions stored thereon that when processed by a content personalization system, cause the content personalization system to perform operations comprising:

categorizing original content to be provided to the user into a plurality of data packets, wherein the original content comprises content related to one or more domains, wherein each of the plurality of data packets comprises data of similar domains;

categorizing the user into a class of a plurality of classes based on one or more parameters associated with the user and identifying a vocabulary of words suitable for the class, wherein each class is associated with a domain of the one or more domains;

identifying relevant content for the class based on domain of the user in the class, profile of creator creating the original content and the original content;

modifying the original content for the class by performing at least one of inserting a new data packet, obtained based on the relevant content, in the original content and deleting a data packet from the plurality of data packets in the original content, wherein modification is based on comparison between the original content and the relevant content;

generating a target content for the class based on the vocabulary of words associated with the class and modified original content, wherein the vocabulary of words is identified by identifying the class to which the user belongs and identifying the vocabulary of words suitable for the class using a forward classifier realized through a Long Short Term Memory (LSTM), and wherein the vocabulary of words comprises equivalent words and words identified as effective for the class; and providing the target content to the class by incorporating one or more features of a presenter, selected from one or more presenters, for presenting the target content.

16. The method as claimed in claim 1, wherein the identification of the vocabulary of words suitable for the class is based on previous content provided to the user.

* * * * *